US011100658B2

(12) United States Patent
Muhleman

(10) Patent No.: US 11,100,658 B2
(45) Date of Patent: Aug. 24, 2021

(54) IMAGE GEORECTIFICATION WITH MOBILE OBJECT REMOVAL

(71) Applicant: The United States of America as represented by the Secretary of the Navy, San Diego, CA (US)

(72) Inventor: Daniel H. Muhleman, El Cajon, CA (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 16/739,351

(22) Filed: Jan. 10, 2020

(65) Prior Publication Data

US 2021/0217185 A1  Jul. 15, 2021

(51) Int. Cl.
*G06K 9/00* (2006.01)
*G06T 7/32* (2017.01)
*G06T 7/00* (2017.01)

(52) U.S. Cl.
CPC .................. *G06T 7/32* (2017.01); *G06T 7/97* (2017.01); *G06T 2207/10032* (2013.01); *G06T 2207/20081* (2013.01)

(58) Field of Classification Search
CPC .................................. G06T 7/32; G06T 7/97
USPC ........................................................ 382/103
See application file for complete search history.

(56) References Cited

U.S. PATENT DOCUMENTS

| 6,338,023 | B1 | 1/2002 | Bourgeois |
| 8,078,004 | B2 | 12/2011 | Kang |
| 8,958,980 | B2 | 2/2015 | Miksa |
| 9,106,715 | B1 | 8/2015 | Novak |
| 9,886,491 | B2 | 2/2018 | Hong |
| 10,370,014 | B2 | 8/2019 | Matson |
| 10,437,850 | B1 | 10/2019 | Hong |
| 2014/0312165 | A1* | 10/2014 | Mkrtchyan ............ B64D 47/08 244/13 |
| 2017/0085863 | A1* | 3/2017 | Lopez .................. H04N 13/128 |
| 2018/0130217 | A1* | 5/2018 | Ray ......................... G06T 7/337 |

* cited by examiner

*Primary Examiner* — Stephen P Coleman
(74) *Attorney, Agent, or Firm* — Naval Information Warfare Center, Pacific; Kyle Eppele; J. Eric Anderson

(57) ABSTRACT

Method comprises receiving, by at least one memory, from at least one imaging system, at least two input images. The method includes comparing, by a processor, the at least two input images to each other such that nonstationary portions of the at least two input images are determined by either separating, by the at least one processor, each of the two input images into multiple pixel regions, and generating an error matrix for each of said multiple pixel regions. If an error value in the error matrix falls within a predetermined range, the pixel region is a nonstationary portion of the input images; or identifying, by a machine learning system, nonstationary portions of the input images. The pixels from nonstationary portions are removed from the at least two input images.

9 Claims, 8 Drawing Sheets

IMAGE GEORECTIFICATION WITH MOBILE OBJECT REMOVAL

STATEMENT OF GOVERNMENT INTEREST FEDERALLY-SPONSORED RESEARCH AND DEVELOPMENT

The United States Government has ownership rights in this invention. Licensing inquiries may be directed to Office of Research and Technical Applications, Naval Information Warfare Center, Pacific, Code 72120, San Diego, Calif., 92152; telephone (619)553-5118; email: ssc_pac_t2@navy.mil. Reference Navy Case No. 104,096.

BACKGROUND OF THE INVENTION

Field of Invention

This disclosure relates generally to image processing and, more particularly, to georectification.

Description of Related Art

Georectification is the process by which an image is tied to a coordinate system so that it can be located on a map. Different images, including overhead satellite images, may need to be pieced together so that they align properly, such as with image registration and/or georectification. Certain items in images are more stable for registration/georectification purposes. Other items, such as mobile or nonstationary portions of the image—like vehicles, people and animals—may be less stable. For example, in a driveway shown on a satellite image, a car or other vehicle may be parked in a different spot on different days since most drivers do not park their cars in the exact same spot every day. With these nonstationary portions in the image, image registration and/or georectification become more difficult since the satellite image and the image to be registered and/or georectified will have greater differences.

There is a need for a method and system for georectification and/or registration that do not suffer from these shortcomings.

BRIEF SUMMARY OF INVENTION

The present disclosure addresses the needs noted above by providing a system and method for improved image georectification with mobile object removal. In accordance with one embodiment of the present disclosure, a method is provided for improved image georectification with mobile object removal. The method comprises receiving, by at least one memory, from at least one imaging system, at least two input images.

The method further includes comparing, by at least one processor, the at least two input images to each other such that nonstationary portions of the at least two input images are determined by either separating, by the at least one processor, each of the at least two input images into multiple pixel regions, and generating an error matrix for each of said multiple pixel regions, wherein if an error value in the error matrix falls within a predetermined range, the pixel region is a nonstationary portion of the at least two input images; or identifying, by a machine learning system, nonstationary portions of the at least two input images.

The method also includes removing, by the at least one processor, pixels from the nonstationary portions of the at least two input images.

These, as well as other objects, features and benefits will now become clear from a review of the following detailed description, the illustrative embodiments, and the accompanying drawings.

BRIEF DESCRIPTION OF DRAWINGS

The accompanying drawings, which are incorporated in and form a part of the specification, illustrate example embodiments and, together with the description, serve to explain the principles of the system and method for improved contrast enhancement. In the drawings:

FIG. 3 illustrates an error matrix in accordance with one embodiment of the present disclosure.

FIGS. 5A and 5B illustrate error matrices associated with registering images 2A and 2B, in accordance with one embodiment of the present disclosure.

DETAILED DESCRIPTION OF THE INVENTION

The present method and system provide improved image georectification with mobile object removal. The present system and method take advantage of a priori knowledge of the types of mobile or nonstationary portions of the image that move around in the image. The present system and method identify those mobile or nonstationary portions which may include cars, motorcycles, people, animals, large trees that tend to blow in the wind, etc. This a priori knowledge may be established through, e.g., a machine learning system. In order to establish this a priori knowledge, the machine learning system may be shown objects that look like cars. The machine learning system may also be shown objects that are not cars. In this manner, the machine learning system would be able to identify cars. The same is true for other image components such as people and animals. Software that does this type of machine learning is commercially available, off-the-shelf.

After the present system and method learn which objects are mobile or nonstationary, they examine an image for objects that are shaped like these objects. If there is a match, the system and method remove pixels that contain these objects. Then, what is left in the image is registered.

In lieu of using machine learning, the present system and method may identify moveable or nonstationary portions by comparing at least two input images that the user wants to georectify (i.e., assign a coordinate system to so that it can be located on a map) or register. An error matrix may inform as to where the input images and additional images differ. Where error is sufficiently large, the pixel portion of the image that resulted in the error will be removed. Then, what is left in the image is registered.

Figure 1:
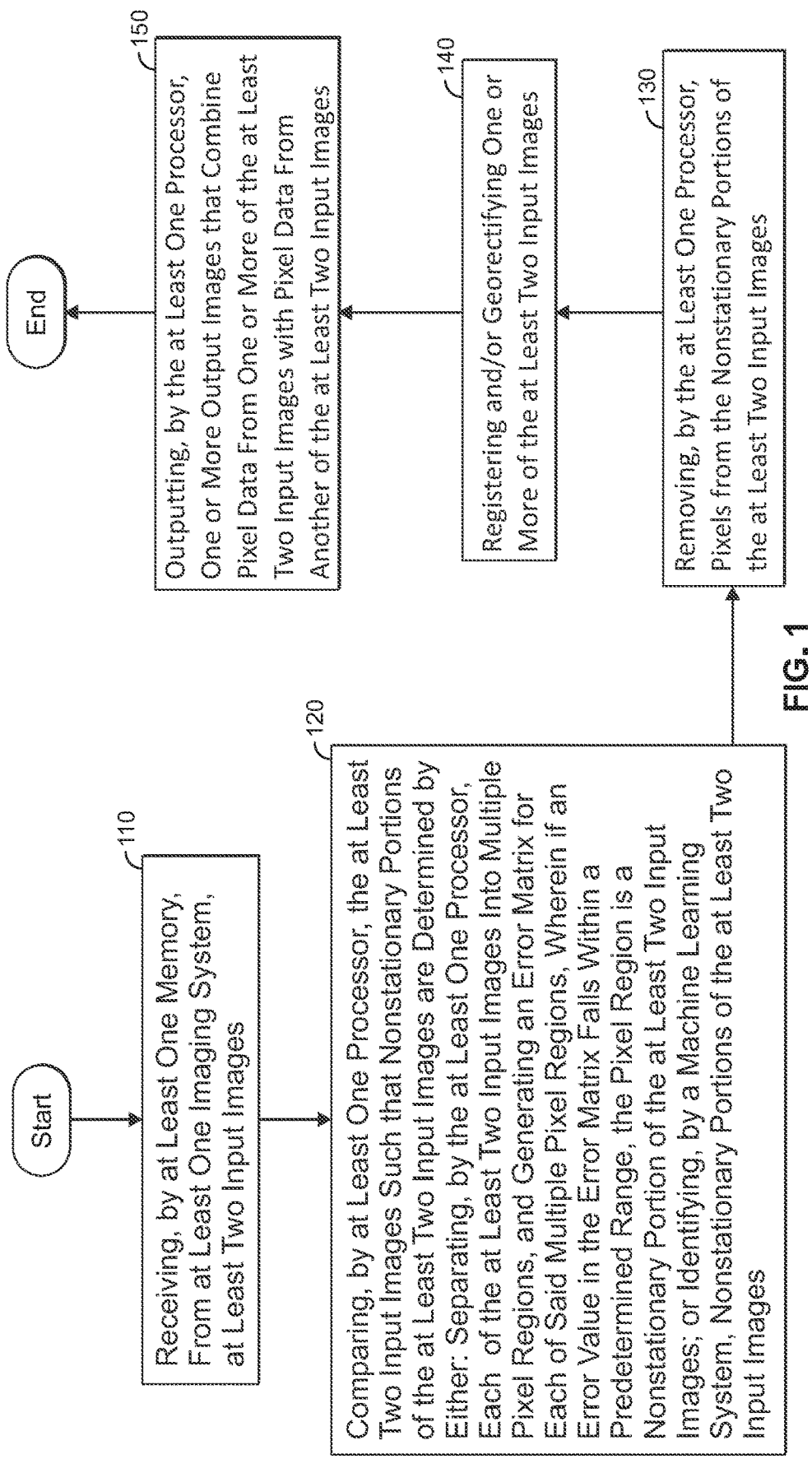
FIG. 1 illustrates a flow chart for a method for improved image georectification with mobile object removal in accordance with one embodiment of the present disclosure.

FIG. 1 illustrates a flow chart for a method for improved georectification with mobile object removal in accordance with an embodiment of the present disclosure. At step 110, the method includes receiving, by at least one memory, from at least one imaging system, at least two input images. These at least two input images are visible images, infrared images or radar images. These at least two input images are color, monochrome, or panchromatic. The imaging system may be mounted on, connected to, or otherwise associated with a satellite or unmanned aerial vehicle. The images may be overhead images that are taken from an aerial vehicle, such as a satellite.

At step 120, the method includes comparing, by at least one processor, the at least two input images to each other such that nonstationary portions of the at least two images are determined. This comparison may be performed in at least two ways. First, the comparison could be performed by separating, by the at least one processor, each of the at least two input images into multiple pixel regions, and generating an error matrix for each of said multiple pixel regions. If an error value in the error matrix falls within a predetermined range, the pixel region is a nonstationary portion of the at least two input images. In the present example, where an error value for a pixel region falls within a certain range, the pixel region is a nonstationary portion of the at least two input images.

As an alternative to performing an error analysis that involves an error matrix and error values, the comparison may be performed by identifying, by a machine learning system, nonstationary portions of the at least two input images. Machine learning provides the present method with a priori knowledge of nonstationary portions such as vehicles, people, and animals by showing the machine learning system objects that look like vehicles, people and animals. The machine learning system may also be shown objects that are not cars. In this manner, the machine learning system would be able to identify cars. The same is true for other nonstationary portions. Machine learning systems are commercially available. For example, they may be found in commercial, off-the-shelf software. At step 130, the method includes removing, by the at least one processor, pixels from the nonstationary portions of the at least two input images. In this manner, the inconsistencies between the at least two input images to be registered/georectified may be reduced, thus increasing the likelihood that the at least two input images can be successfully matched with an existing coordinate system so that it can be located on a map. Once the nonstationary portions of the at least two input images are removed, then those portions are not taken into account for purposes of image registration and/or georectification. The image may be registered using a number of image registration techniques that are known in the art.

The image may be georectified using a number of georectification techniques. For example, a correlation-based approach may be used. Given that the at least two input images are taken of the same scene but from different points of view, a set of points in one or more of the at least two input images is matched with the same points in another of the at least two input images.

At step 140, the method includes registering and/or georectifying the at least two input images. In this manner, an input image is tied to, or associated with, a coordinate system so that it can be located on a map. At step 150, the method includes, after the removing step, outputting, by the at least one processor, one or more output images that combine pixel data from one or more of the at least two input images with pixel data from another of the at least two input images.

Figure 2A:
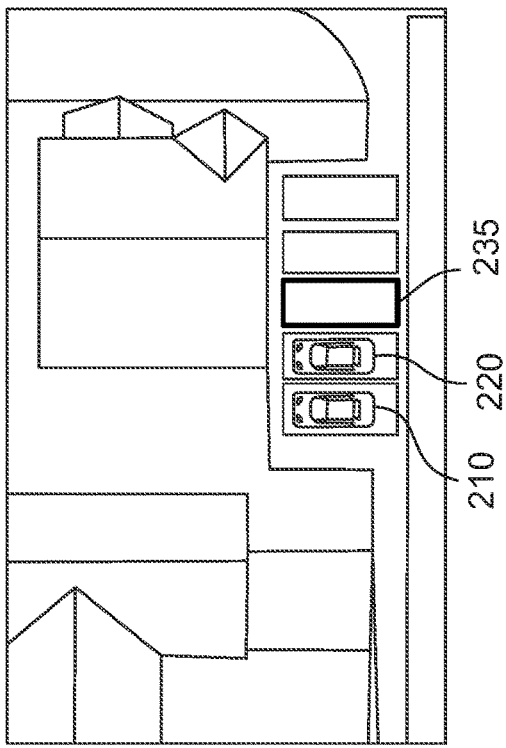
FIGS. 2A-2C illustrate input images in accordance with one embodiment of the present disclosure.
Figure 2B:
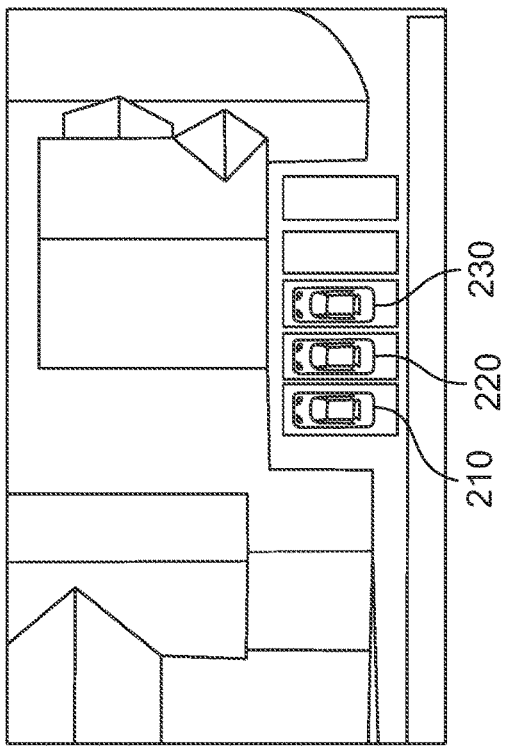
Figure 2C:
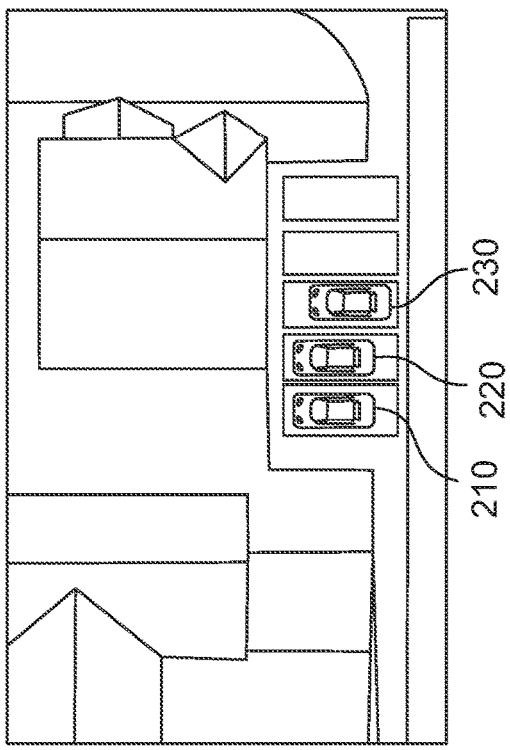

FIGS. 2A-2C illustrate input images in accordance with one embodiment of the present disclosure. In FIG. 2A, an image of a house and a driveway is shown with three cars 210, 220, 230 parked in a driveway. In FIG. 2B, that same location shows two cars 210, 220, with the third car 230 now missing from the driveway. In FIG. 2C, the rightmost car 230 is re-parked and is now slightly farther down and left than before.

Figure 3:
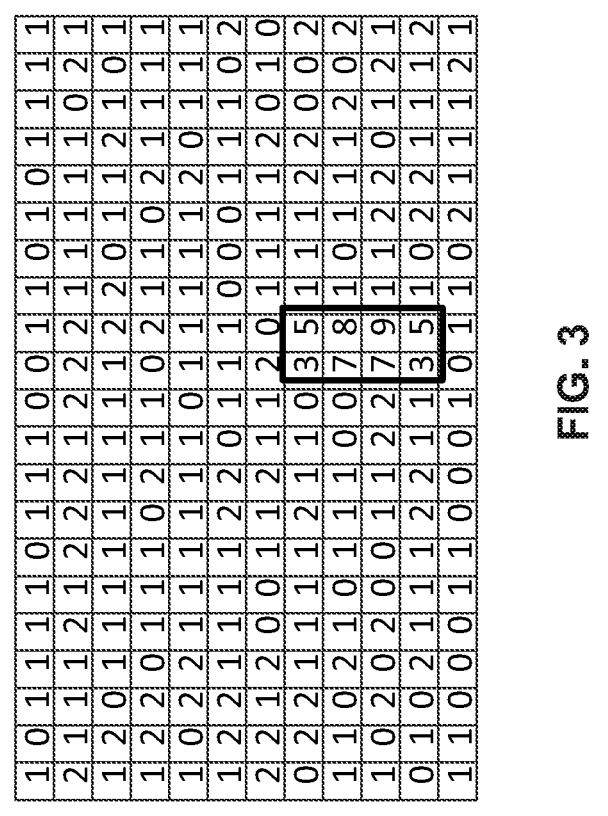

As part of the process of registering images 2A and 2B, an error matrix may be calculated. The error matrix has twenty-one horizontal rows and twelve vertical columns. As shown in FIG. 3, the error matrix 300 shows values between zero and ten, with zero representing no error, or a perfect match between images. At the higher end of the spectrum, ten represents the greatest amount of error. Error matrix 300 is obtained after aligning the two reference images (FIGS. 2A and 2B) one time in order to minimize total error (0-10 scale). As shown by the error matrix 300, a large error in location exists for the rightmost car (shown in black rectangle) as no good match will be found at that location when registering. This is reflected in higher error numbers in that region of error matrix.

The error matrix shown in FIG. 3 will be the same after the first iteration of the method herein of the present disclosure. As shown, most of error matrix shows low error (0-2) except in the location where the car moved (with errors from 3-9) which are blacked out as shown by matrix placeholder 314. This initial registration may have been skewed by attempting to minimize error in the region of the car that moved. This is especially true when the image has a large percentage of moving elements (e.g. an image of a freeway at rush hour, or an image with heavy shadows).

Figure 4B:
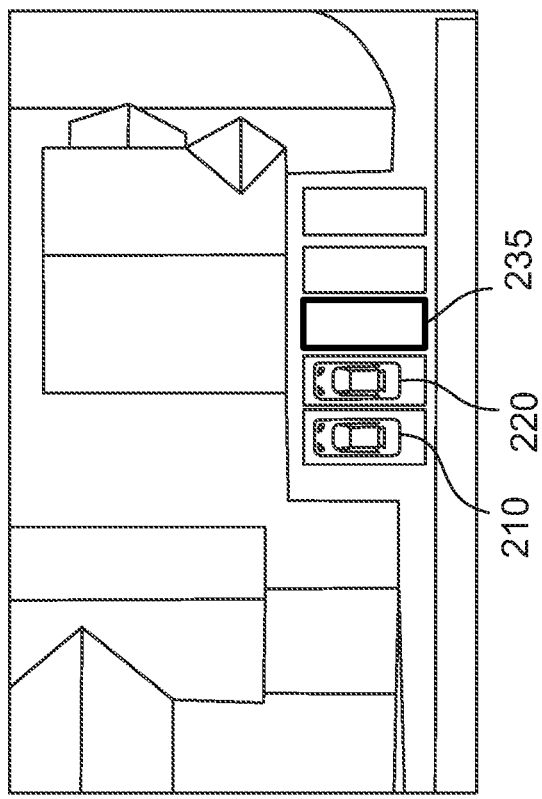
FIGS. 4A and 4B illustrate registering images 2A and 2B, in accordance with one embodiment of the present disclosure.
Figure 4A:
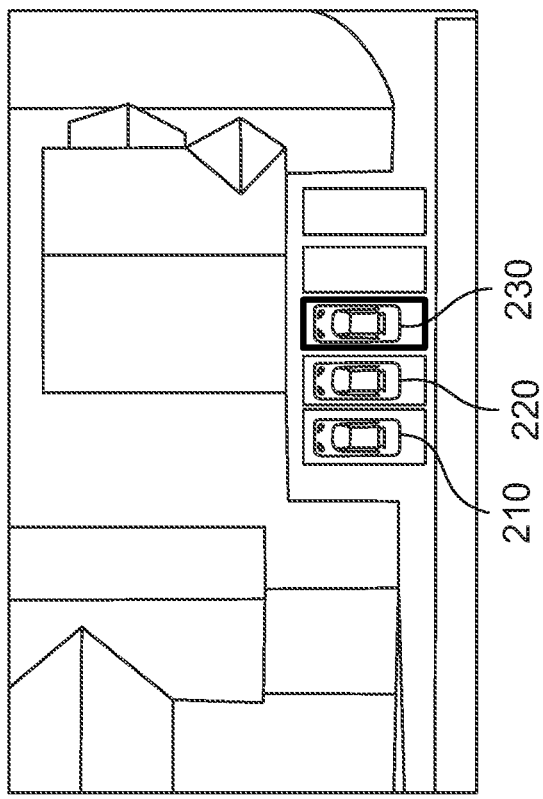

FIGS. 4A and 4B illustrate registering input images 2A and 2B, in a first iteration of an iterative approach, in accordance with one embodiment of the present disclosure. In FIG. 4A, three cars 210, 220, 230 are present, including car 230 which is the rightmost car. In FIG. 4B, the rightmost car has been moved from the scene—whether from being driven, towed or otherwise—and is missing from the image. The rightmost vehicle location 235 remains.

Figures 5A, 5B:
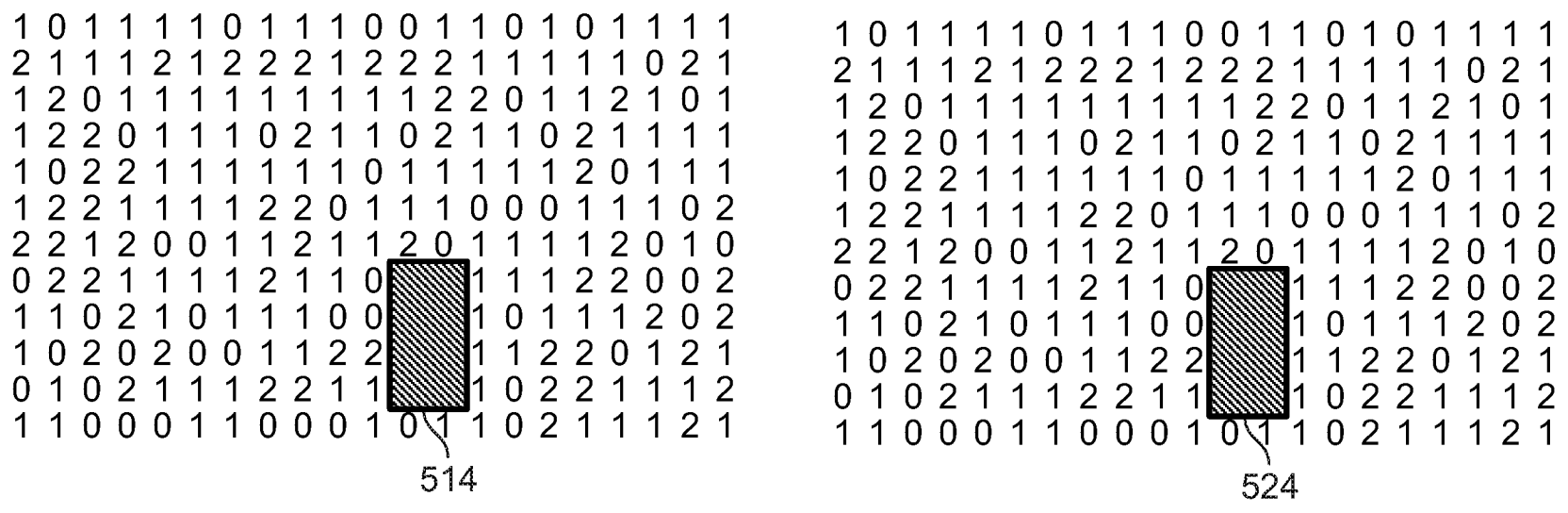

FIG. 5A shows an error matrix 500 for FIG. 2A in a second iteration of the present method for improved georectifcation with mobile object removal. Similarly, FIG. 5B shows an error matrix 500 for FIG. 2B in a second iteration. You may recall that in FIG. 2B, the rightmost car was missing from the input image when compared to its position in FIG. 2A. Regions with high error levels are now excluded (shown by the blacked out or cross-hatched areas 514, 524) and registration optimization is run again over remaining portion of the image. Only one region is shown for simplicity of illustration.

Figure 6A:
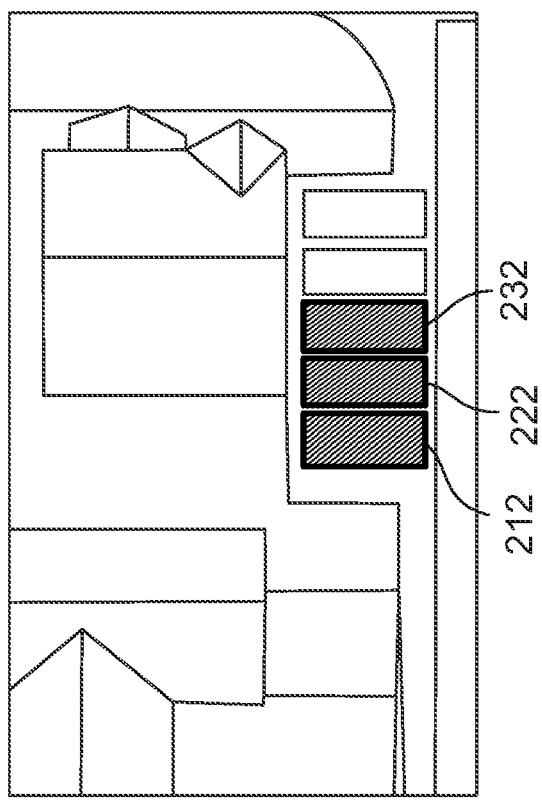
FIGS. 6A and 6B illustrate registering images 2A and 2C using machine language, in accordance with one embodiment of the present disclosure.
Figure 6B:
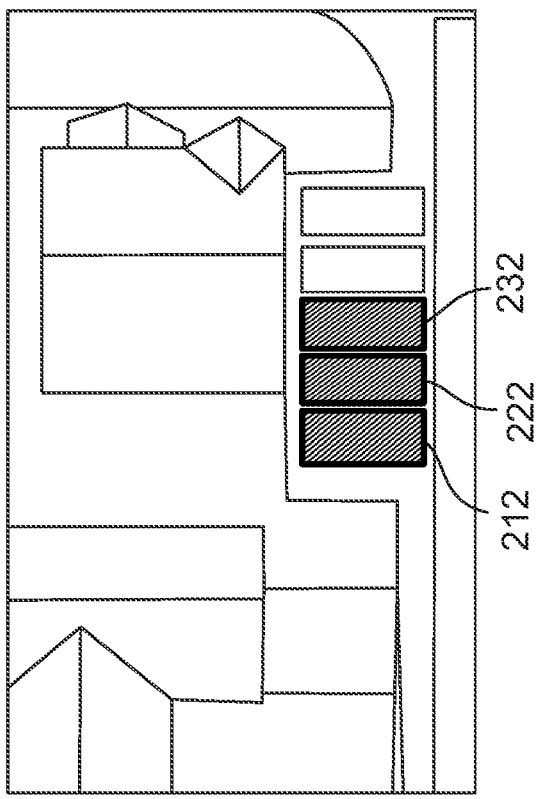

In FIGS. 6A and 6B, the images of FIGS. 2A and 2C are registered with a machine learning approach. Cars identified by machine learning are excluded from the set of pixels over which the registration calculations are made, eliminating their contribution to registration error. These cars have been replaced by placeholders 212, 222, 232. These machine learning systems learn from data, and they are able to recognize patterns. In some instances, machine learning algorithms can surpass human intelligence over a broad range of tasks.

Figure 7A:
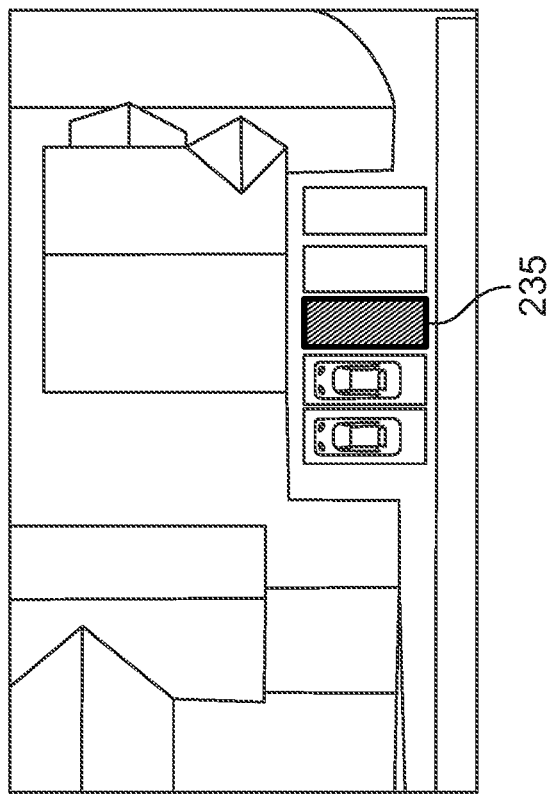
FIGS. 7 and 7B illustrate registering images 2A and 2C, in accordance with one embodiment of the present disclosure.
Figure 7B:
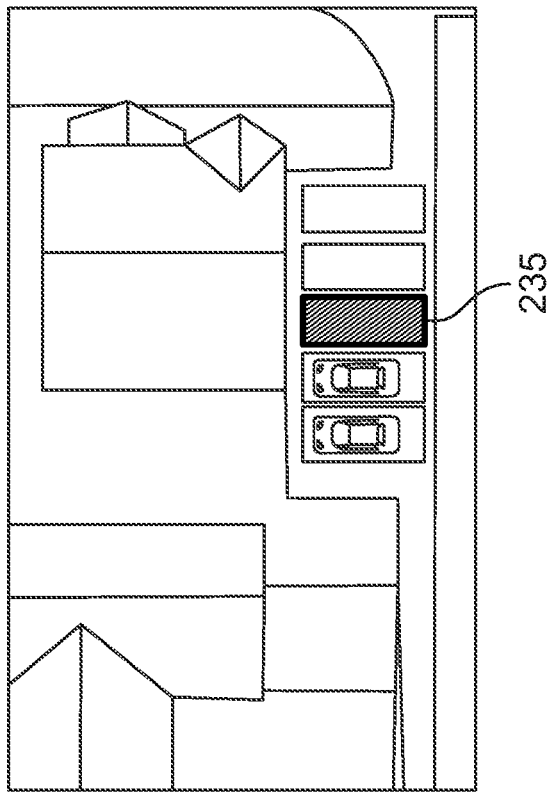

FIGS. 7A and 7B show an iterative approach for registering images 2A and 2C, in accordance with an embodiment of the present disclosure. The first iteration of registration yields significantly above average error at rightmost vehicle location placeholder 235 after optimizing over entire scene. The image discrepancy between the two initially-registered images is quantified across the entire scene. The rightmost vehicle location placeholder 235 is identified as having significantly higher than average error. Its corresponding pixels are then excluded and the registration is performed again without them yielding a more accurate registration.

Figure 8:
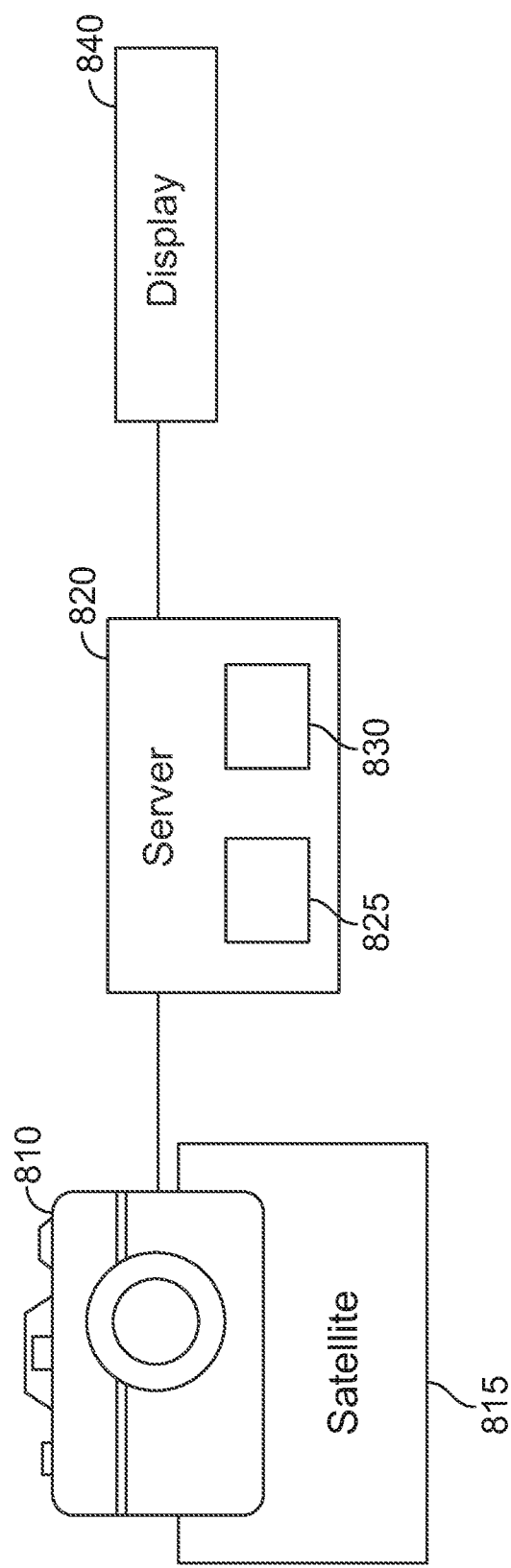
FIG. 8 illustrates a system for improved image georectifiation with mobile object removal in accordance with one embodiment of the present disclosure.

FIG. 8 is a system for improved georectification with mobile object removal in accordance with one embodiment of the present disclosure. The system 800 may include an imaging system 810, a server 820 that is operably coupled to the imaging system 810, a machine learning system 825 that is operably coupled to the imaging system and may reside on server 820 or not, a processor 830 that is operably coupled to the imaging system 810 and may reside on server 820 or not, and a display 840 that is operably coupled to the imaging system 810. The imaging system 810 could be any digital imaging system. Digital imaging system 810 can connect to server 820. The input images may be fed from the imaging system 810 to the server 820. The server 820, which may include its own memory and processor, may feed the image to another processor 830 such as a graphics processing unit or field programmable gate array. The memory residing in server 820, is sufficient to hold each of the at least the two input images.

As an alternative to the system of FIG. 8, the server 820 may be removed and the imaging system 810 and processor 830 can be connected immediately adjacent to each other. Some processing that was done by the server 820 may be off-loaded to the imaging system 810 (which may include a processor) and/or the processor 830 shown in FIG. 8.

Software (not shown in FIG. 8) may be resident in the memory of server 820, which may cause the processor 830 to perform one or more steps of a method for improved image georectification with mobile object removal as set forth herein. If mechanical/electrical devices (whether existing as part of the imaging system or added thereafter) are used to further aid in in this process, such devices may be located within the body of imaging system 810 or elsewhere as can be appreciated by one of ordinary skill in the art.

The processor 830 may be configured to receive, at a memory device, at least two input images from an imaging system. The processor 830 may also be configured to perform the steps of the present system and method, including the steps described in FIG. 1, which include but are not limited to, in one step, the processor 830 could be configured to compare the at least two input images such that nonstationary portions of the at least two input images are determined. The processor may be configured to perform this comparison in at least two ways. First, the processor 830 could be configured to perform the comparison by separating, by the at least one processor, each of the at least two input images into multiple pixel regions, and generating an error matrix for each of said multiple pixel regions. If an error value in the error matrix falls within a predetermined range, the pixel region is a nonstationary portion of the at least two input images. For example, the pixels could be assigned error values ranging from zero to ten, with zero representing a match and ten representing the greatest error value. If an error value for a pixel region falls within a range of three to ten, or other predetermined threshold or range, then the pixel region is considered a nonstationary portion of the at least two input images.

As an alternative to the processor 830 performing an error analysis with an error matrix and error values, the comparison may be performed by identifying, by a machine learning system 825, nonstationary portions of the at least two input images.

The processor 830 may be configured to remove nonstationary portions of the at least two input images, e.g., by removing pixels from those nonstationary portions. After the removal, the processor 830 may be configured to replace the removed nonstationary portions of the at least two input images with pixel data from the at least two input images. The nonstationary portions of the at least two input images include one or more of vehicles, people and animals.

The processor 830 may also be configured to register and/or georectify one or more of the input images. In this manner, the image is tied to, or associated with, a coordinate system so that it can be located on a map. The processor 830 may also be configured to generate one or more output images that combine pixel data from one or more of the input images with the others of the at least two input images.

The speed of the processor 830 needed may depend on the application in which the processor 830 is used, as can be appreciated by one of ordinary skill in the art.

The present system and method provide more accurate, less noisy, georectification. No feature-recognition algorithms must be used to locate objects that are likely to move (e.g. people, cars), but instead the difference between the multiple input images merely needs to be examined and sections that exceed some threshold removed from consideration in the georectification algorithm(s) used afterward to georectify the new image.

The foregoing description of various embodiments has been presented for purposes of illustration and description. It is not intended to be exhaustive or to limit the invention to the precise forms disclosed, and obviously many modifications and variations are possible in light of the above teaching. The example embodiments, as described above, were chosen and described in order to best explain the principles of the invention and its practical application to thereby enable others skilled in the art to best utilize the invention in various embodiments and with various modifications as are suited to the particular use contemplated. It is intended that the scope of the method and system be defined by the claims appended hereto.

What is claimed as new and desired to be protected by Letters Patent of the United States is:

1. A method, comprising:
   receiving, by at least one memory, from at least one imaging system, at least two input images;
   separating, by at least one processor, each of the at least two input images into multiple pixel regions;
   assigning a value to each pixel region;
   calculating an error value for each pixel region by subtracting a given pixel region value of one of the at least two input images from a pixel region value of another of the at least two input images, wherein all the error values are organized in an error matrix;
   aligning the at least two input images by shifting the at least two input images with respect to each other until the error matrix has minimum total error;
   creating an output image based on one of the at least two input images where all pixel regions having an error value, as shown in the error matrix with minimum total error, that falls within a predetermined range are removed such that the output image does not include nonstationary portions of the at least two input images; and
   registering the output image with the at least one processor.

2. The method of claim 1, wherein
no feature-recognition algorithms are used to locate objects that are likely to move in the at least two input images.

3. The method of claim 1, further comprising:
after the registering step, georectifying, by the at least one processor, the output image.

4. The method of claim 1, wherein the at least one imaging system includes the at least one processor.

5. The method of claim 1, wherein the at least two input images are visible images, infrared images or radar images.

6. The method of claim 1, wherein the at least two input images are color, monochrome, or panchromatic.

7. The method of claim 1, wherein the at least one imaging system is a satellite imaging system.

8. The method of claim 1, wherein the one or more input images is captured by the at least one imaging system from an aerial vehicle.

9. The method of claim 1, wherein the nonstationary portions of the at least two input images include one or more of cars, people, animals, or vehicles.

\* \* \* \* \*